United States Patent

Bailly

[15] 3,675,827

[45] July 11, 1972

[54] PORTABLE METERING CHARGERS FOR LOW VISCOSITY MATERIALS

[72] Inventor: Roger Gaston Bailly, Aubenas, France

[73] Assignee: Societe Anonyme, Societe Miniere Et Metallurgique De Penarroya, Paris, France

[22] Filed: Oct. 30, 1970

[21] Appl. No.: 85,608

[30] Foreign Application Priority Data

Nov. 20, 1969 France..................................6940010

[52] U.S. Cl..............................................222/194, 222/440
[51] Int. Cl..............................................................B65d 5/54
[58] Field of Search..................222/194, 195, 282, 425, 437, 222/446, 457, 564, 504, 192, 440 X; 73/429

[56] References Cited

UNITED STATES PATENTS

| | | | |
|---|---|---|---|
| 3,192,964 | 7/1965 | Vogt | 222/440 X |
| 3,257,045 | 6/1966 | Carpentier | 222/504 X |
| 3,344,887 | 10/1967 | Lavengood | 222/194 X |
| 2,630,014 | 3/1953 | Chester | 73/429 |

*Primary Examiner*—Robert B. Reeves
*Assistant Examiner*—Larry Martin
*Attorney*—Mm. Melville, Strasser, Foster & Hoffmann

[57] ABSTRACT

The invention comprises a portable metering apparatus for supply of low viscosity materials in measured quantities and intended mainly for handling charges of explosive material such as ammonium nitrate and fuel oil, said apparatus comprising a hopper for the material to be metered, a horizontal cylinder located beneath the hopper and having a piston member mounted therein, which piston member includes a first and second section spaced axially apart to provide a transfer passage and a metering device into which material flows by gravity from the hopper through the transfer passage into a measuring chamber incorporated in the metering device until the piston is actuated to cut off the flow and permit discharge of a measured amount of material from said chamber. A metering plunger is adjustably mounted within the measuring chamber by which its capacity can be pre-set to measure a give quantity. The cylinder has inlet and outlet orifices for connection respectively to the hopper and the metering chamber. The piston member is urged, e.g. by spring means, to a normal or open position in which the hopper remains in communication with the metering chamber through the transfer passage to permit of transfer of material by gravity from the hopper to said chamber, pneumatically operated means being provided for effecting displacement of the piston member to an operative or release position to cut off the flow of material from the hopper and permit release of the measured quantity in the metering chamber.

6 Claims, 5 Drawing Figures

INVENTOR/S
ROGER GASTON BAILLY

MELVILLE STRASSER FOSTER & HOFFMAN
attorneys

PORTABLE METERING CHARGERS FOR LOW VISCOSITY MATERIALS

The present invention relates to a portable metering apparatus or loader for delivery of low viscosity materials in given quantities, especially of ammonium nitrate - fuel oils explosive mixtures.

The apparatus permits the distribution under pressure of strictly accurate amounts of slightly viscous materials and finds an application more particularly in the injection into drill holes, blast hole, etc.. of an explosive mixture of ammonium nitrate and fuel oil. This mixture is well known in the art under the name AN.FO (ammonium nitrate-fuel oil).

Apparatus are already known for injecting materials of the above-mentioned type under pressure, some such apparatus being described in an article by C.H. Vivian in the American publication "Compressed Air Magazine" of May, 1962, Volume 67, No. 5, pages 19–20. They essentially comprise a receptacle which contains the product to be injected and which is provided at its lower portion with an outlet hopper. The hopper feeds into the vicinity of a venturi device provided in a conduit which is connected to a source of compressed air as well as an injection orifice. Owing to the suction effect of the venturi device, the compressed air carries the product to the orifice and into the drill or blast hole that is being filled to a predetermined level.

In certain apparatus of this type, the explosive reservoir is sealed; air under pressure is introduced thereinto which acts as a piston against the product to be injected and increases the rate of filling the drill or blast hole.

A disadvantage of such known devices is that it is impossible to meter the quantity of explosives that is introduced into the particular drill or blast hole. Such a disadvantage is particularly serious when dealing with faulted ground : the explosive not only fills the hole provided but also the large faults which are in communication with this hole. It is evident that such a situation risks uncontrolled cave-ins which may result in serious accidents.

In order to overcome this disadvantage one might consider adapting a metering device of a generally known type to a loader of the above-mentioned type. Such apparatus are widely used in various industries and are described, for example, in French Pat. No 972,145, U.S. Pat. No. 2,630,014 and German Pat. No. 79,533. The first comprises a hollow sliding member having a fixed capacity that is displaceable by translation between a filling position and an emptying position. The second comprises a sort of ladle having an adjustable capacity owing to a helically movable bottom. The last effects a non-adjustable metering action by means of a space between two pneumatically movable stops.

The known devices in which the product to be injected is constantly under pressure impose technological limitations and increase the safety problems. On the other hand the known devices in which the product is at atmospheric pressure have the disadvantage of an insufficient flow.

An object of the invention is therefore to provide a metering device in which the reservoir contains the product to be injected which is not under pressure and which nevertheless provides an increased flow.

Another object of the invention is to provide a metering device adapted to inject low viscosity materials in volumetric quantities which are accurately determined by the use in situ regardless of the dimensions of the hole drilled for the reservoir.

A supplementary object of the invention is to provide a metering device particularly suitable for the injection of a AN.FO mixture in the drill or blast hole.

The metering apparatus of the invention comprises in combination a hopper, which is preferably cylindro-conical, a distributing device to which material from the hopper is transferred by gravity and including a horizontal cylinder in which operates a double piston member and pneumatically operating means for effecting displacement of the piston to and from an operative position in which material passes from the hopper to a metering device, the said device conveniently being mounted immediately beneath the said cylinder and comprising a vertical cylindrical body part having a metering chamber in which is adjustably mounted a metering plunger so that by adjusting the position of the plunger the capacity of the chamber can be adjusted, and accordingly the volume of material which will be discharged or otherwise released therefrom by evacuating it, preferably using air pressure, through a manifold or outlet at the bottom of the metering chamber, at the same time as the piston is moved to close the outlet opening of the hopper.

The piston member is normally held by spring means in a position in which the outlet from the hopper is open to allow material to flow by gravity into the measuring chamber, and is moved to an operative or closing position by compressed air admitted into the cylinder of the piston under the control of a valve-cock.

Adjustment of the metering plunger may be effected by a rotary pointer which is fast therewith and co-operates with a helical cam face in or on the wall of the metering body. The pointer may be provided by a screw and wing nut so that by releasing the latter the position of the screw which projects through a slot in the wall of the cylinder may be adjusted to give the required volume of material to be admitted into the metering device.

The invention is illustrated in the attached drawings, in which.

Figure 1:
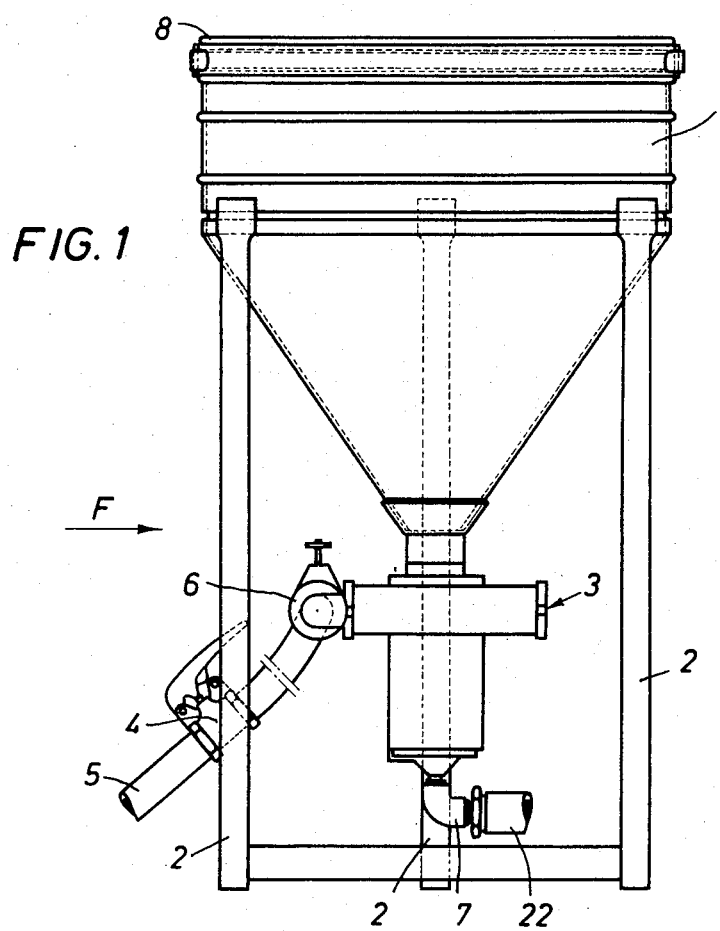
FIG. 1 is an elevation and FIG. 2 a plan view of the metering apparatus or loader in accordance with one embodiment of the invention.
Figure 2:
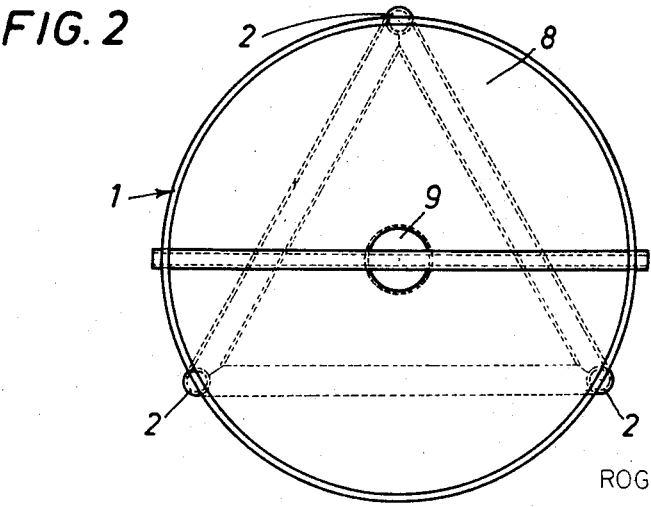

Referring to FIGS. 1 and 2, the apparatus comprises a circular hopper 1 supported on three legs 2, the base terminating in a truncated conical portion (FIG. 1) from which material to be metered, e.g., a mixture of ammonium nitrate and fuel oil in grain form, as in the example selected, is delivered to the metering system or device indicated generally at 3.

The metering device is operated by air under pressure supplied via duct 5, a valve-cock 4 and a manual pressure-reducing valve or control cock 6. The metered mixture is discharged through an outlet duct 7 to which the injection pipe is connected.

The hopper is closed, at the top, by a cover 8 having a central outlet opening or throat 9 for introduction of the mixture into the hopper.

Figure 3:
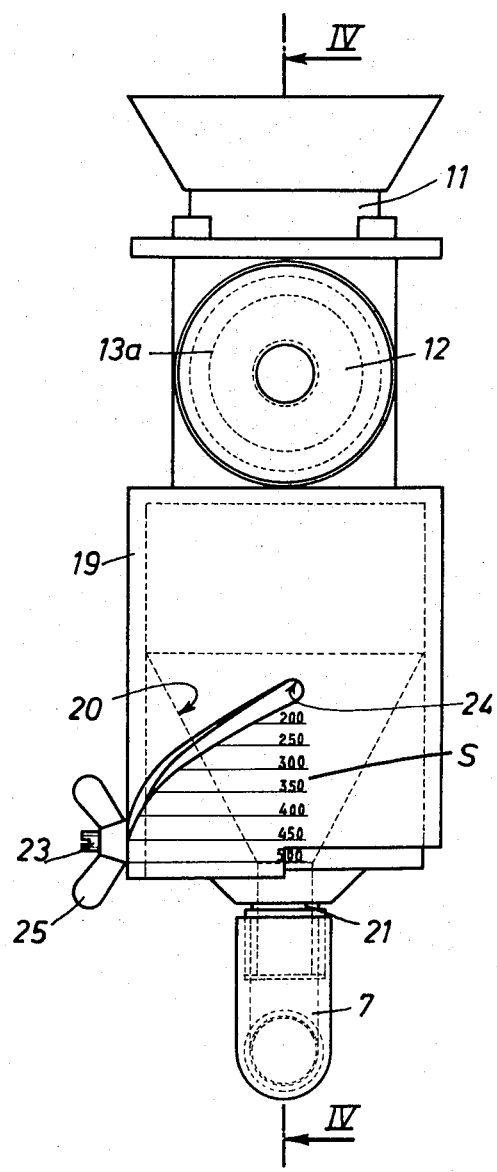
FIG. 3 is a side view in the direction of arrow F of FIG. 1.

The metering and injection system comprises a cylinder 10 (FIGS. 3–5) of aluminum alloy, in which are upper and lower openings 10a and 10b which are diametrically opposed and have a diameter equal to that of the outlet opening of hopper 1.

Cylinder 10 is connected to the hopper by means of a collar 11 having a truncated conical portion to fit the conical base portion of the hopper.

Cylinder 10 is closed at its ends by knurled screw plugs 12 and 15, the plug 12 having a threaded axial socket for connection thereto of a pipeline from the pressurized air cylinder with the control circuit.

In the cylinder 10 is a stainless steel piston member including a hollow front section 13a and a solid rear section 13b interconnected by an axial rod 13c, the annular chamber C enclosed between which has an axial length equal to the diameter of the discharge opening in the collar 11.

The solid part 13b of the piston is provided with a spigotted end 13d on which is located one end of a spring 14 whose other end is engaged in an axial recess 15' in the plug 15. In a counter bore in the plug 15 is a washer 16 of resilient material, which acts as a damper for the piston.

Vent holes 17 18 are provided respectively in the front end of the cylinder 10 and in the closure plug 15 to permit of the escape or entry of air during the piston movements.

Secured to the underside of the cylinder 10 is a cylindrical body part 19 housing the metering device, in the form of a plunger 20. The axis of part 19 is aligned with the vertical axis of the outlet opening of the hopper and the cylinder opening 10a and 10b and at its upper end the body 19 has an opening 19a of the same diameter as the opening 10b of the cylinder 10, while its open lower end has slidably mounted therein the plunger 20, which is axially adjustable in relation to a calibrated scale.

The plunger 20 is formed with a truncated conical recess 20' extended by a manifold 21, which is provided with an external thread to receive an elbow 7 or other member for connection of the metering device to a discharge line 22 (FIG. 1) for evacuating the metered material.

The plunger 20 is fixedly secured in its adjusted position by a screw 23 and wing nut 24, the screw projecting through a helical cam slot 24 in the cylinder wall 19. It is thus possible to fix the plunger 20 in a position corresponding to a required volume as indicated by the graduated scale S which may be glued onto the body 19 or engraved upon it.

Figure 5:
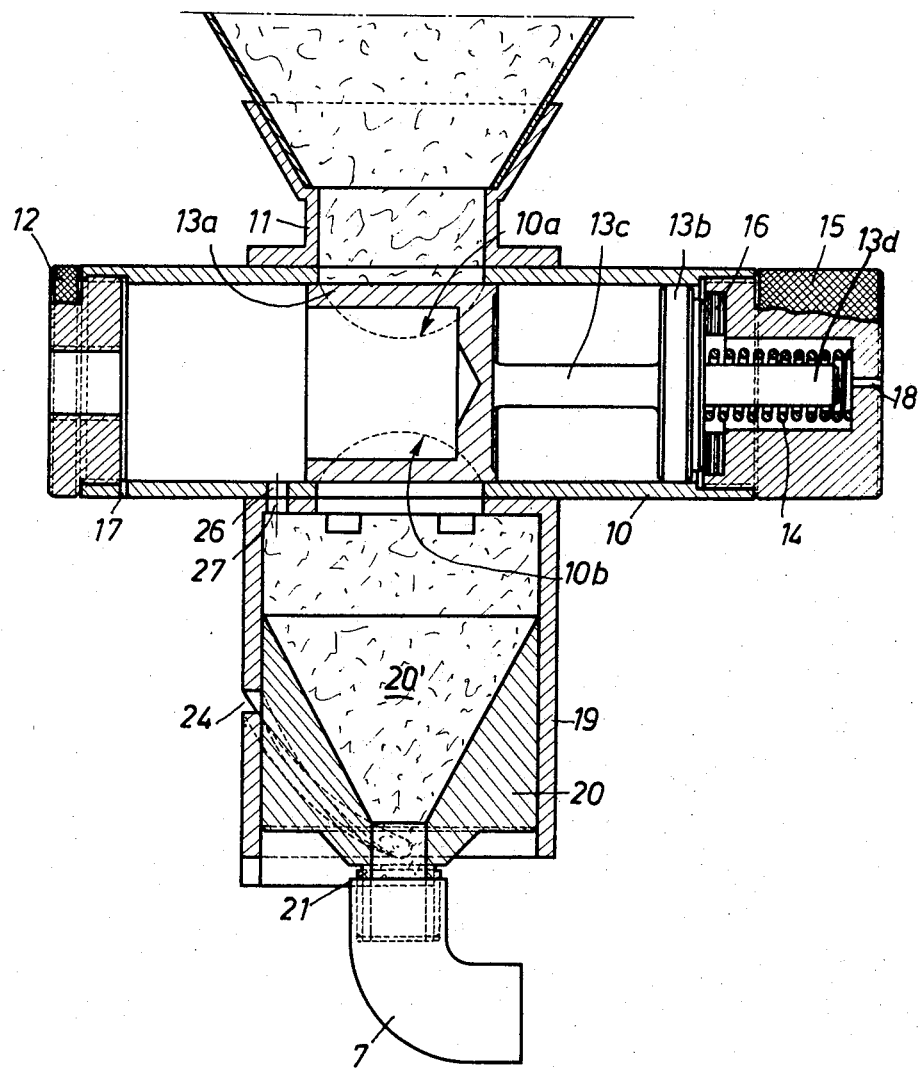
FIG. 5 is a similar cross-section, but showing the apparatus in position of evacuation of the metered amount of material.

Holes 26 and 27 drilled respectively in the cylinder 10 and in the upper wall of the metering cylinder permit of communication to be established between the two chambers when the piston has been moved to its closed position as shown in FIG. 5.

Figure 4:
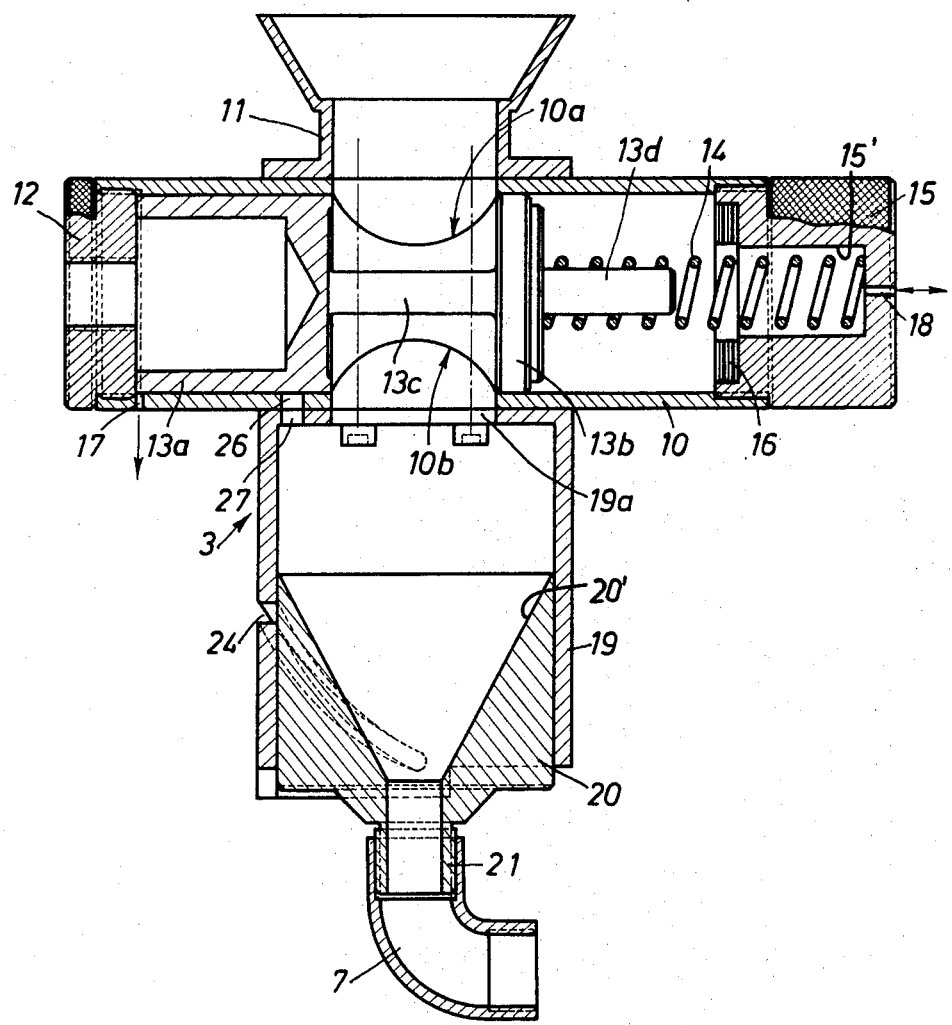
FIG. 4 is a section on line IV—IV of FIG. 3 showing the apparatus at rest with piston in its operative or open position.

In operation, assuming that the double piston 13a, 13b is in its position of rest shown in FIG. 4, where it is held by the spring 14, the chamber or transfer passage C enclosed therebetween coincides with the openings 10a and 10b of the cylinder. In this position the material to be distributed in successive doses falls by gravity from the hopper 1 into the cup-shaped interior 20' of the metering plunger 20 which has been adjusted to a position (by reference of screw 23 to scale S) corresponding to the desired volume as indicated above.

To effect the injection of material, e.g., ammonium nitrate, the valve-cock 4 is actuated so as to allow compressed air to enter the cylinder 10. The air then pushes the pistons 13a, 13b against the compression spring 14 until part 13b of the piston comes to abut against the resilient washer 16 of the end plug 15.

In this position, shown in FIG. 5, the front section 13a of the piston closes the orifices 10a and 10b of the cylinder, thus effectively preventing further flow of material into the metering device. When in this position the holes 26 and 27 register and compressed air can then enter the cylinder 19 and eject the measured amount of material previously transferred thereto and contained in the injection manifold.

When the lever of valve-cock 4 is released the return spring 14 forces the piston back to its initial position shown in FIG. 4 and the cycle is able to begin again.

The apparatus is thus capable of distributing material similar to that quoted in the example, that is to say, ammonium nitrate in the form of a relatively dry granular mixture in spite of it being mixed with fuel oil. There is no danger of flow of the substance into the elbow 7, the stabilization slope in this being in the neighborhood of 350°.

In the event of the material being in past from with a more fluid consistency, it is possible to add to the metering device a positively-driven mechanical closure valve.

The metering apparatus of this invention may be composed of elements made of stainless steel or other stainless materials or materials which are resistant to corrosion. It is of relatively small size, which makes it portable and movable.

The metering apparatus which is the object of the invention may be used to fill containers of all kinds, but it is more particularly applicable in pyrotechnics for the injection of charges into blast holes.

It operates under continuous pressure and uses compressed air only at the moment of injection of precise and regular charges, whatever be the diameter of the blast hole drilled. This prevents waste of ammonium nitrate and makes more accurate shots possible, because the injected doses can be adjusted as the user desires and on the actual site of the shots.

What is claimed is:

1. A metering apparatus which is portable for supply of low viscosity materials in measured quantities comprising the combination of a hopper for the material to be metered, said hopper having a bottom opening for discharge of material by gravity therefrom, a horizontally extending cylinder having an inlet orifice and an outlet orifice, and a piston member mounted therein, said piston member having a first section and a second section axially spaced from one another to define a transfer passage, said inlet orifice being connected to said hopper bottom opening to permit of flow by gravity of material from the hopper into said transfer passage, a metering device including a chamber having an upper opening and a bottom opening for discharge of metered quantities therefrom, said upper opening being connected to said outlet orifice, means urging said piston to a normal open position in which material can flow by gravity from the hopper through the transfer passage into the metering chamber, a metering plunger displaceably mounted within the metering chamber by which its volumetric capacity can be varied to give a predetermined metered amount, means for manually adjusting the position of said plunger, pneumatically actuated means for effecting displacement of the piston member to a position in which said first section thereof closes the opening from said hopper to cut off flow of material therefrom and permit discharge of the measured quantity of material within the metering chamber, said cylinder and metering chamber having ports to permit air pressure within the cylinder to be transmitted to the metering chamber, whereby discharge of material from the metering chamber takes place under pressure.

2. A metering apparatus as claimed in claim 1 comprising a metering chamber in which the metering plunger comprises a recess of tapering width to assist in discharge of material through the outlet opening in the bottom thereof.

3. A metering apparatus as claimed in claim 1 comprising a cylinder which is open-ended and having a plug secured in each open end thereof, the plug at one end having a bore for connection to a source of air under pressure and the plug at the opposite end having a recess to accommodate a return spring, one end of which abuts the second section of the piston.

4. A metering apparatus as claimed in claim 1 in which admission of air to the cylinder is controlled by a manually operated valve.

5. A metering apparatus as claimed in claim 1 wherein the metering device comprises a cylinder within which the metering plunger is displaceable and said plunger has attached thereto a stud for co-operation with a cam face in the wall of the metering cylinder.

6. A metering apparatus as claimed in claim 5 in which a helical cam slot is provided in the wall of the metering cylinder and the stud is of a length to project through the slot and a scale is provided on the outer face of said wall to indicate the position of adjustment of the plunger.

* * * * *